(12) United States Patent
Tu

(10) Patent No.: US 6,691,027 B1
(45) Date of Patent: Feb. 10, 2004

(54) METHOD AND APPARATUS FOR FINDING SHORTEST OVERALL PATH OF MULTIPLE DESTINATIONS BY NAVIGATION SYSTEM

(75) Inventor: Ihung S. Tu, Anaheim, CA (US)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 10/174,697

(22) Filed: Jun. 15, 2002

(51) Int. Cl.[7] .............................. G01C 21/00
(52) U.S. Cl. .................................... 701/202
(58) Field of Search ............... 701/200, 201, 701/208, 211, 213; 340/990, 995; 342/357, 457

(56) References Cited

U.S. PATENT DOCUMENTS

| | | | |
|---|---|---|---|
| 5,168,452 A | | 12/1992 | Yamada et al. |
| 5,559,707 A | * | 9/1996 | DeLorme et al. ........... 701/200 |
| 5,797,112 A | | 8/1998 | Komatsu et al. |
| 5,802,492 A | * | 9/1998 | DeLorme et al. ........... 455/456 |
| 5,832,406 A | | 11/1998 | Iwami et al. |

* cited by examiner

Primary Examiner—Thu Nguyen
(74) Attorney, Agent, or Firm—Muramatsu & Associates (57) ABSTRACT

A method for finding a shortest overall path length from the start to the final destination when a user of a navigation system wants to visit many intermediate destinations before the final destination. The method includes the steps of calculating a route to all of the destinations and tentatively determining an overall route specifying an order of tour destination where the overall route includes two or more route segments each connecting two destinations, checking the overall route as to whether any two route segments intersect with one another, and identifying the destinations of the route segments intersecting one another and reversing the order of destinations so that the two route segments no longer intersect one another.

10 Claims, 11 Drawing Sheets

| 0 | 1 | 2 | 3 | 4 |
|---|---|---|---|---|
| Start | A | B | C | Last |

Fig. 6B

| 0 | 1 | 2 | 3 | 4 |
|---|---|---|---|---|
| Start | A | C | B | Last |

METHOD AND APPARATUS FOR FINDING SHORTEST OVERALL PATH OF MULTIPLE DESTINATIONS BY NAVIGATION SYSTEM

FIELD OF THE INVENTION

This invention relates to a method for use in a navigation system for finding a shortest path, and more particularly, to a method for finding a shortest overall path length from the start to the final destination when a user of a navigation system wants to visit many intermediate destinations before the final destination.

BACKGROUND OF THE INVENTION

A navigation system performs travel guidance for enabling a user to easily reach the selected destination. A typical example is a vehicle navigation system. The present invention is not limited to a vehicle navigation system but is applicable to other types of navigation system such as a PDA (Personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the vehicle current position from a data storage medium, for example, a CD-ROM (compact disk read-only memory) or a DVD (digital versatile disc), and displays a map image on a monitor screen (display) while superposing a mark representing the current location of the vehicle on a predetermined portion of the map image. Alternatively, such map data can be provided to the vehicle from a remote server through a communication network such as Internet.

The vehicle position is determined by self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves a problem of position detection failure such as in a tunnel or a building where the satellite radio signals are obstructed. Therefore, recent navigation systems utilize both self-contained navigation and satellite navigation functions to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

Figure 1A:
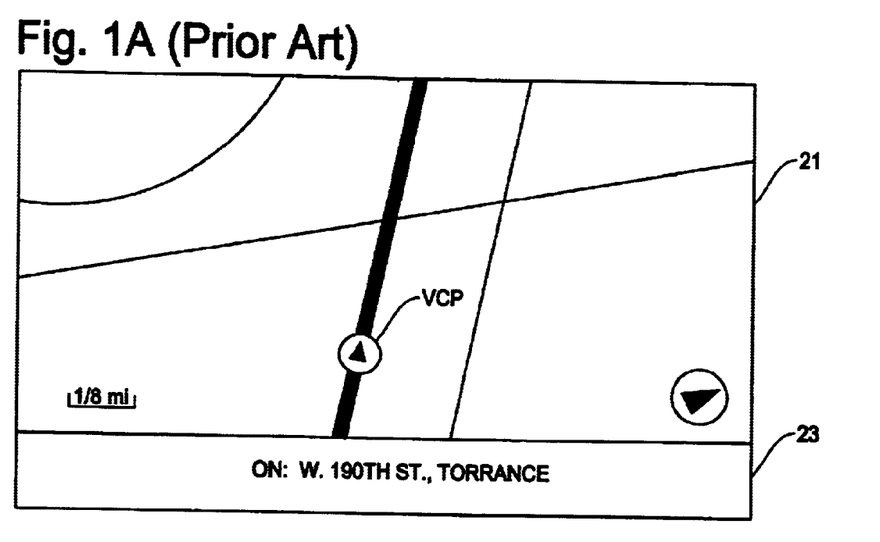
FIGS. 1A Wand 1B are schematic diagrams showing an example of locator map display and route guidance display, respectively, of a navigation system.

FIG. 1A shows an example of a locator map display containing a vehicle current position mark VCP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

Figure 1B:
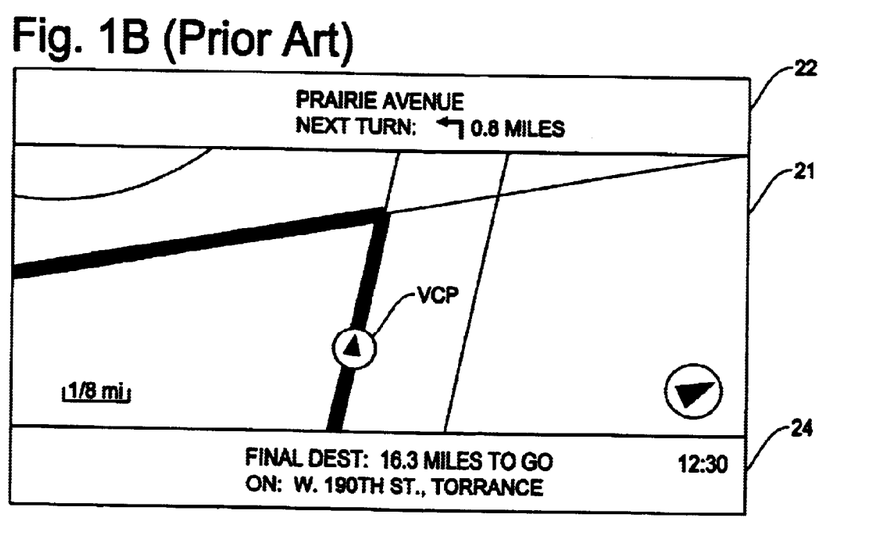

FIG. 1B shows an example of route guidance display which performs the route guidance function. The route guidance display is activated after specifying the destination. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE".

Typically, the current street "W 190TH ST" and the left side of the street "PRAIRIE AVE" will be highlighted in the map image 21. Further, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

Figure 2A:
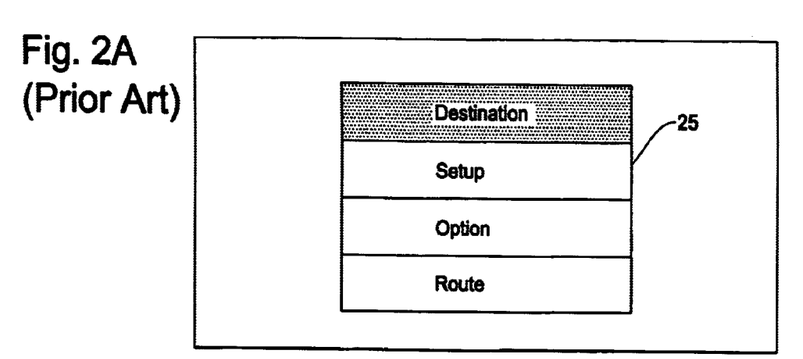
FIG. 2A is a main menu.
Figure 2B:
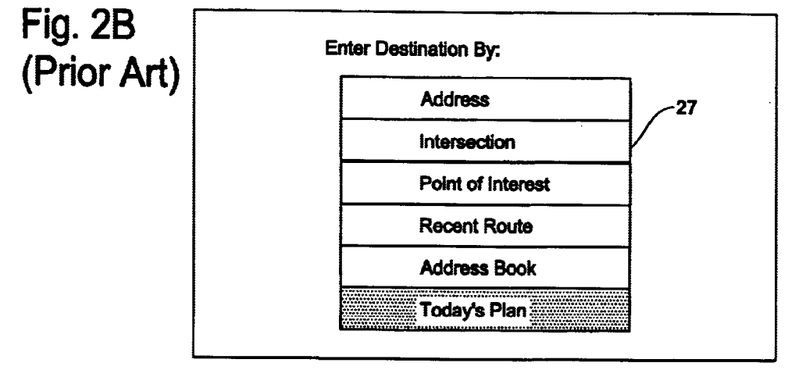
FIG. 2B is a destination set menu and FIG. 2C shows a key board display for entering the destination.
Figure 2C:
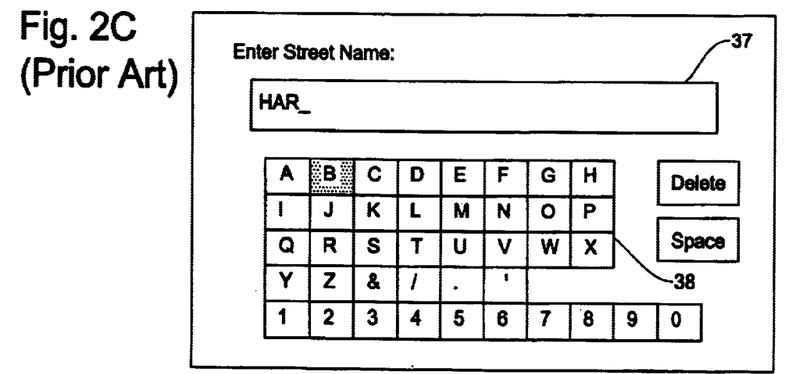

In order to be guided by the route guidance mode such as shown in FIG. 1B, a destination must be specified in the navigation system so that the system can find one or more routes to get to the destination. FIGS. 2A–2C show examples of display shown on the monitor screen during the operation of inputting the destination.

By operating a menu key, a main menu screen 25 such as shown in FIG. 2A is displayed on the navigation system and a menu item "Destination" is selected from the main menu. This allows the navigation system to display an "Enter Destination by" screen 27 as shown in FIG. 2B for specifying an input method for selecting the destination. The "Enter Destination by" screen 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" screen 27 include "Recent Route" for specifying the destination based on the recent destinations saved in the navigation system, "Address Book" for selecting the address of the destination out of the addresses stored in the system, and "Today's Plan" for specifying two or more destinations in the navigation system. For example, when a user wants to go to several destinations before the final destination, the navigation system calculates an efficient order and routes to such destinations.

When selecting, for example, the "Address" in FIG. 2B, the navigation system displays an "Enter Street Name" screen such as shown in FIG. 2C. The screen of FIG. 2C is basically a key board 38 for inputting the city and address in an address input box 37 on the monitor screen. The user inputs the street name and number in the address input box 37 through the key board 38.

After inputting the destination, the navigation system determines a route to the destination based on, for example, the shortest way to reach the destination, the route using many freeways as possible, or the route without using toll road, and the like. Thus, the navigation system moves to the route guidance display such as shown in FIG. 1B which performs the route guidance.

In the "Today's Plan" menu as shown in FIG. 2B, a user specifies two or more destinations through the key board of FIG. 2C or other input methods such as the "Address Book" or "Recent Route" in FIG. 2B. The navigation system finds an efficient route to visit all the destinations until the final destination. For example, to determine the next destination, D the navigation system seeks a next destination which has the shortest distance from the current destination (considering not only physical distances but also travel times and fees, i.e., an overall cost). However, a path determined by a route finding method, such as "Greedy Algorithm" in today's navigation system is not always the best route in terms of finding the shortest overall path length.

Figure 3A:
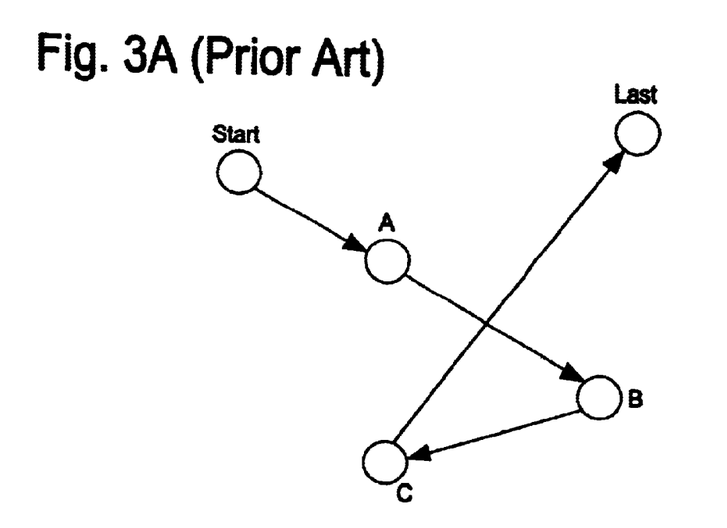
FIGS. 3A and 3B are schematic diagrams showing examples of route determined by the conventional navigation system in the case where several destinations have to be visited before the last destination.
Figure 3B:
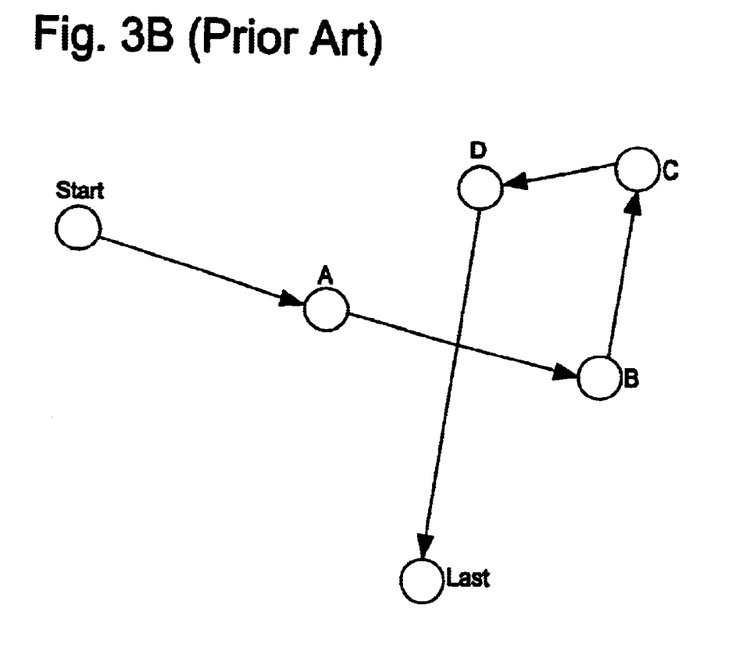

FIGS. 3A and 3B show examples of routes calculated by the navigation system when a user want to visit several places before the final destination. In the example of FIG. 3A, the start point "Start", destinations A, B, C and the last destination "Last" are shown where the navigation system determines the routes of the tour in the order illustrated by the arrows. Similarly, in the example of FIG. 3B, the start point "Start", destinations A, B, C and D, and the last destination "Last" are shown in which the navigation system determines the routes or the tour in the order illustrated by the arrows.

In FIG. 3A, the route between the destinations A and B and the route between the destinations C and Last intersect with one another. Similarly, in FIG. 3B, the path (route segment) between the destinations A and B and the path (route segment) between the destinations D and Last intersect with one another. This means that, in each case, the user has to pass the same point (crossing point) two times, which is considered inefficient for the purpose of traveling the shortest distance. Thus, there is a need of a new method for use in a navigation system for finding a shortest path to the last destination when a user wants to visit several intermediate destinations before reaching the last destination.

SUMMARY OF THE INVENTION

It is, therefore, an object of the present invention to provide a method for finding a shortest path for use with a navigation system when a user wants to visit several places before the last destination.

In the present invention, the navigation method and system is designed to find the shortest path when a user has many places to visit. Typically, the user inputs such destinations in the navigation system when using an input method of "Today's Plan" such as shown in FIG. 2B. The navigation system calculates the effective ways to visit all of the destinations until the last destination. To determine the next destination, as noted above, the navigation system typically seeks a next destination which has the shortest distance from the current destination. The navigation system then checks whether there is any crossing (intersecting point) involved in the calculated routes. If there is a crossing, the navigation system changes the order of tour to achieve the shortest overall path length to the last destination.

More specifically, the method of the present invention for finding a shortest route of tour having multiple destination includes the steps of: specifying two or more intermediate destinations to visit before a final destination, calculating a route to all of the destinations and tentatively determining an overall route specifying an order of tour of the intermediate destinations before reaching the final destination where the overall route includes two or more route segments each connecting two destinations, checking the overall route as to whether any two route segments intersect with one another, and identifying the destinations of the route segments intersecting one another and reversing the order of destinations of the intersecting route segments so that the two route segments no longer intersect with one another, thereby determining the shortest route of tour.

Another aspect of the present invention is a navigation system configured by various means for achieving the, navigation method described above which checks the order of tour and finds a shortest path when a user wants to visit many places before the last destination.

According to the present invention, the navigation method and system enables the user to visit many intermediate destinations and the final destination through the shortest path.

BRIEF DESCRIPTION OF THE DRAWINGS

FIGS. 2A–2C are schematic diagrams showing display examples of a navigation system.

DETAILED DESCRIPTION OF THE INVENTION

The method of the present invention enables a user to reach all of the destination with the shortest overall distance without crossing two or more routes with one another in the tour. In accordance with the present invention, a user such as a driver specifies two or more destinations in addition to the last destination through, for example, a "Today's Plan" menu of the navigation system. The navigation system calculates the route to the destinations and determines the most effective way to the destination that has a shortest overall distance. The navigation method and system of the present invention is described with reference to FIGS. 6–12.

Figure 4:
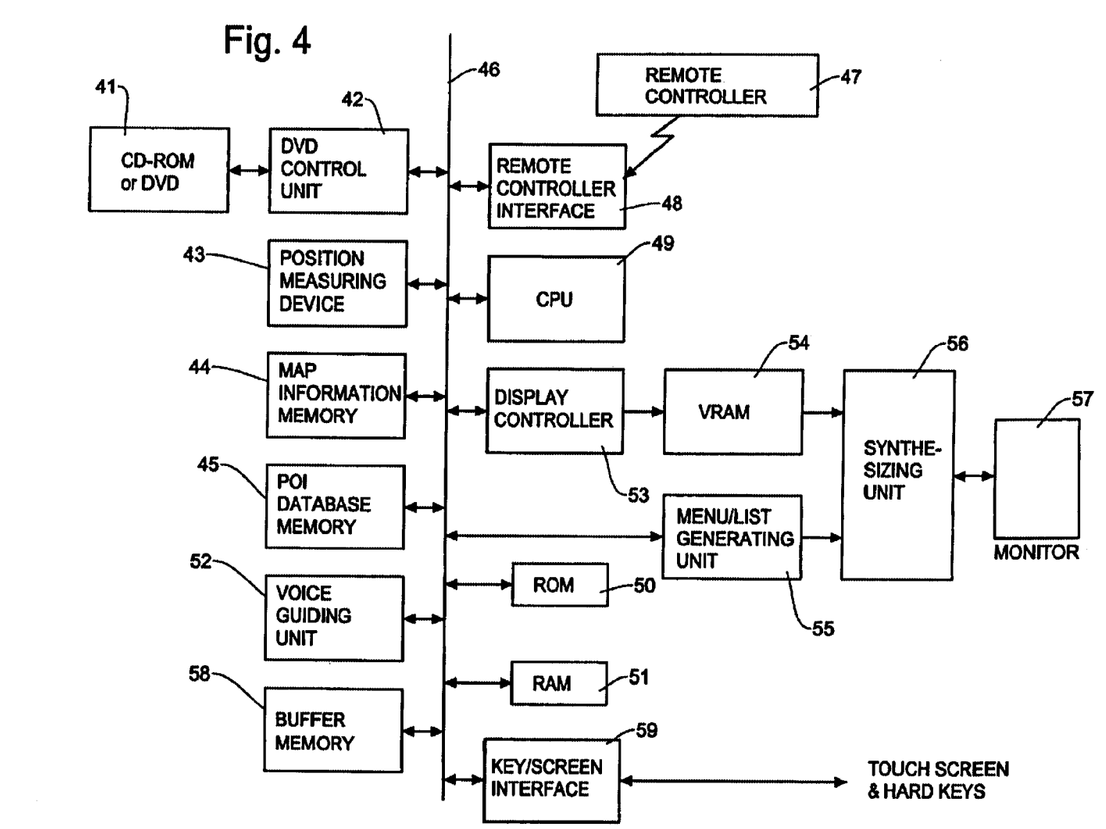
FIG. 4 is a block diagram showing an example of structure in the vehicle navigation system according to the present invention.
Figure 5A:
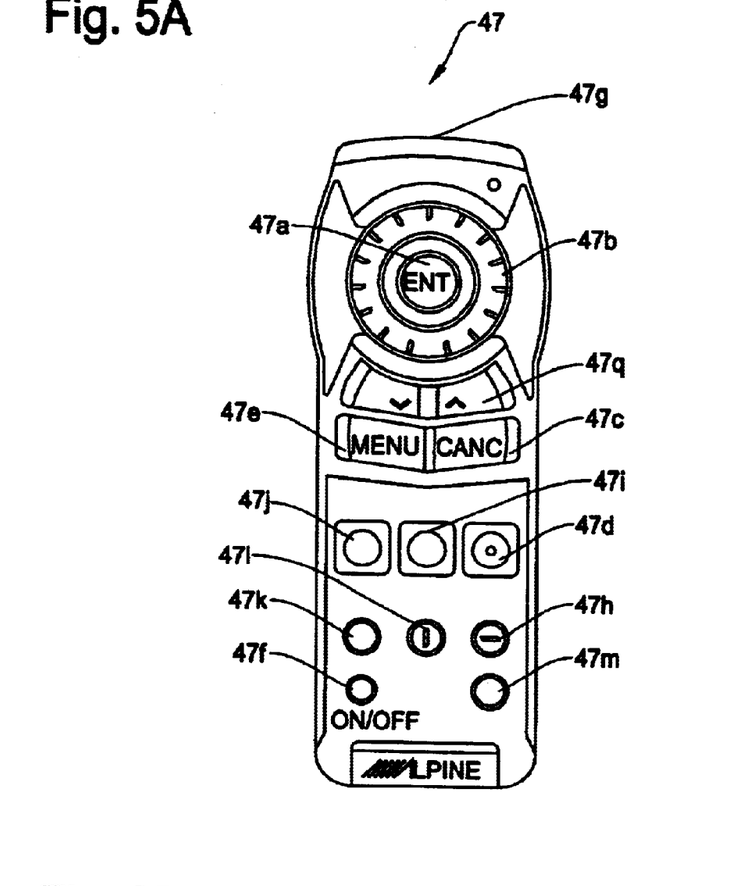
FIGS. 5A and 5B are diagrams showing an example of a remote controller accompanied by the vehicle navigation system of the present invention.
Figure 5B:
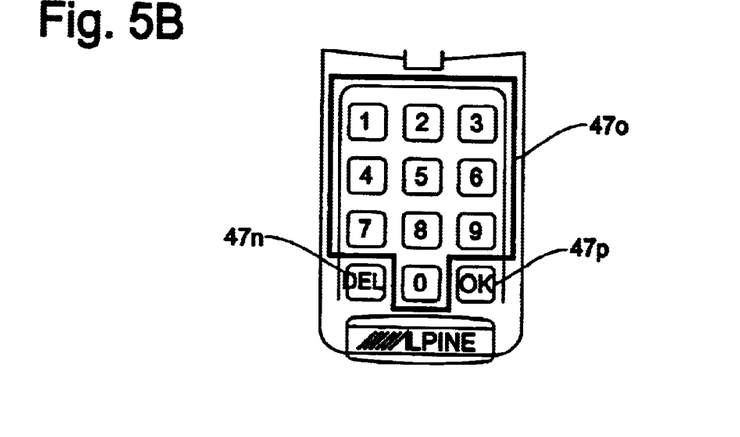

Before going into details of the route finding method of the present invention of, a brief description is made regarding the basic structure of the navigation system with reference to the block diagram of FIG. 4 and an example of remote controller for the navigation system with reference to FIGS. 5A and 5B.

In the block diagram of FIG. 4, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyro for detecting a moving direction, a microprocessor for calculating a position, a GPS receiver, and etc.

The block diagram of FIG. 4 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

The remote controller 47 has a variety of function keys as shown in FIG. 5A and numeric keys as shown in FIG. 5B. The numeric keys appear when a lid in the lower part of FIG. 4A is opened. The remote controller 47 includes a joystick/enter key 47a, a rotary encoder 47b, a cancel key 47c, an MP/RG key 47d, a menu key 47e, a zoom/scroll key 47q, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h starts the route having two or more destinations set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same and similar operations that would be done through the remote controller. For example, the navigation system includes hard keys and a joystick on a head unit of the navigation system mounted on a dash board, a touch screen of the display panel, and voice communication means.

Referring back to FIG. 4, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a buffer memory 58 for temporarily storing data for calculating an order of tour in accordance with the present invention when many destinations are requested by a user, and a key and screen interface 59 for interfacing with various other input means such as hard keys and joystick on a display panel of the navigation system or a touch screen of the navigation system, and the like.

Now, the navigation method and system of the present invention is described with reference to FIGS. 6–12. It should be noted that, in the following description of the invention, it is assumed that the start point and the last destination are predetermined, i.e., fixed. Namely, there is no change in the order of the start point and the last destination in the process of determining the shortest path, and only intermediate destinations will be investigated and may be changed their order.

Figure 6A:
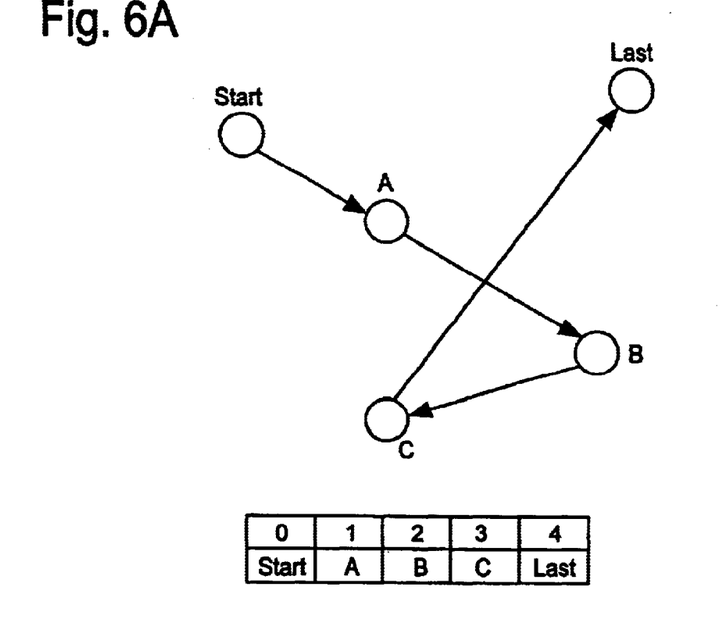
FIG. 6A is a diagram showing the route for visiting the destinations of FIG. 3A and the order of tour in the conventional technology.

FIG. 6A is a diagram showing the route for visiting the destinations of FIG. 3A and the order of tour calculated by the conventional technology. As noted above, when visiting the destinations A, B and C before the last destination, the conventional navigation method may determine the order of tour as shown in the table and by the arrows of FIG. 6A. As noted above, the navigation system typically determines the next destination as the one having the shortest distance from the current destination. Namely, the order shown in FIG. 6A is: destination A, destination B, destination C and the last destination. In this example, the route (route segment) connecting the destinations A and B and the route (route segment) connecting the destinations C and Last intersect with each other. Since the user has to come to the same point (intersecting point) twice, this order of tour is considered inefficient in terms of taking the shortest overall path.

Figure 6B:
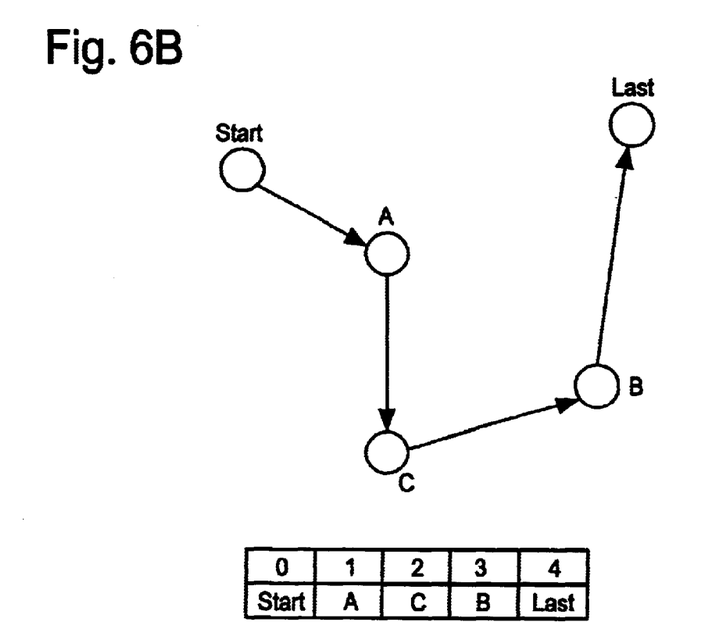
FIG. 6B is a diagram showing an order of tour in accordance with the present invention for the same destinations of FIG. 6A.

FIG. 6B is a diagram showing an order of tour in accordance with the present invention for the same destinations of FIG. 6A. As shown in the table of FIG. 6B, in this case, the order of the tour is: destination A, destination C, destination B and the last destination. Since there is no intersecting point of route segments in this tour, the method of the present invention is able to achieve a shortest overall path length. It should be noted that the order of B, C in FIG. 6A is reversed, i.e., to the order of C, B in FIG. 6B.

Figure 7A:
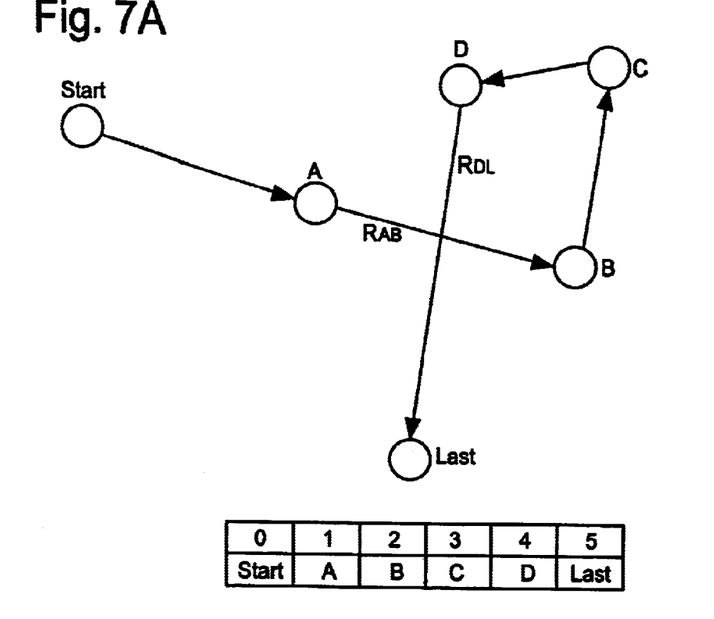
FIG. 7A is a diagram showing the route for visiting the destinations of FIG. 3B and the order of tour in the conventional technology.

Similarly, FIG. 7A is a diagram showing the route and the order of tour for visiting the destinations of FIG. 3B calculated by the conventional technology. As noted above, when visiting the destinations A, B and C before the last destination, the conventional navigation method may determine the order of tour as shown in the table of FIG. 7A. Namely, the order shown in FIG. 7A is: destination A, destination B, destination C, destination D and the last destination. In this example, the route (route segment) $R_{AB}$ connecting the destinations A and B and the route (route segment) $R_{DL}$ connecting the destinations D and Last intersect with each other. Because the user has to come to the same point (intersecting point) twice, this order of tour is considered inefficient in terms of taking the shortest overall path.

Figure 7B:
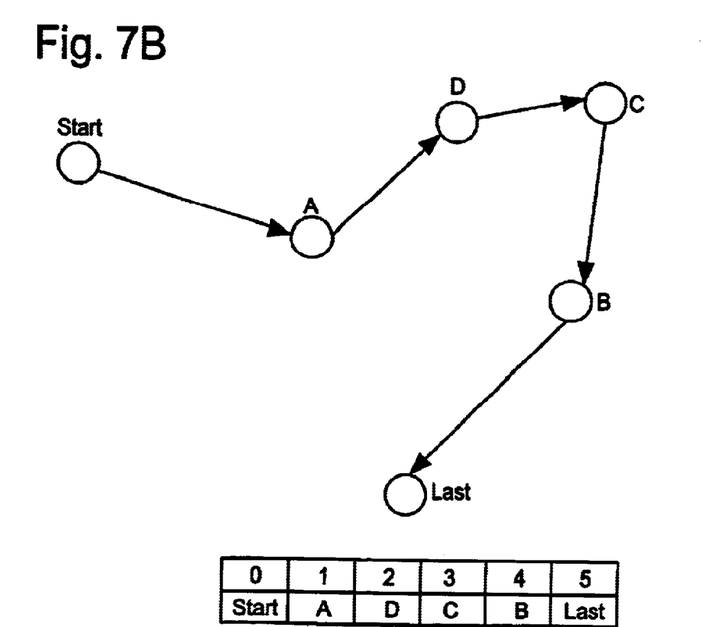
FIG. 7B is a diagram showing a route and an order of tour in accordance with the present invention for the same destinations of FIG. 7A.

In the example of FIG. 7B, which shows an order of tour determined by the method of the present invention when applied to the same destinations of FIG. 7A, there is no crossing of routes. As shown in the table of FIG. 7B, in this case, the order of the tour is: destination A, destination D, destination C, destination B and the last destination. Since there is no intersecting point of route segments in this tour, the method of the present invention is able to attain the shortest overall path length. It should be noted that the order of B, C, D in FIG. 7A is reversed, i.e., to the order of D, C, B in FIG. 7B.

Figure 8A:
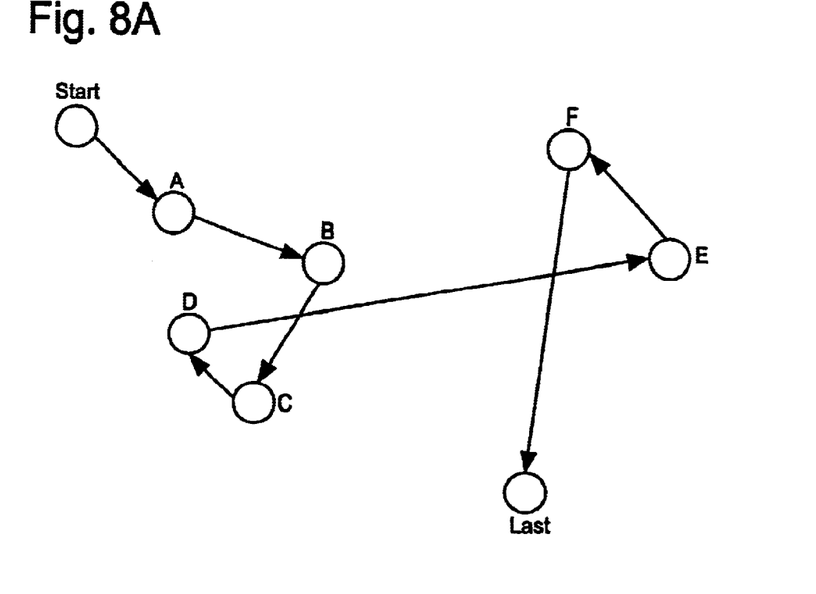
FIG. 8A is a diagram showing a further example of route for visiting the destinations in the conventional technology.
Figure 8B:
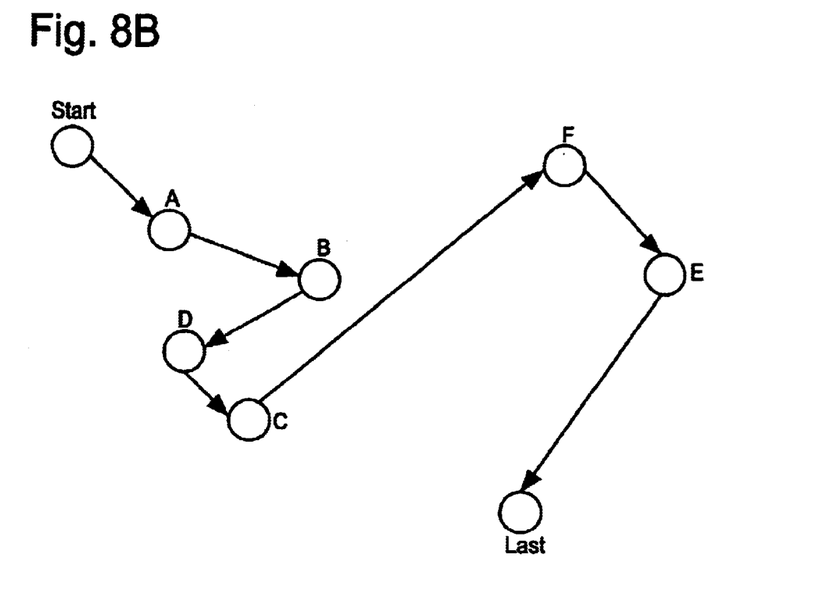
FIG. 8B is a diagram showing a route in accordance with the present invention for the same destinations of FIG. 8A.

Similarly, FIG. 8A is a diagram showing the overall route for visiting many destinations before the final destination in the conventional technology, and FIG. 8B is a diagram showing an order of tour in accordance with the present invention for the same destinations of FIG. 8A. When visiting the destinations A, B, C, D, E and F before the last destination, the conventional navigation method may find the order of tour as destinations A, B, C, D, E, F and the last destination. In this example, the route (route segment) connecting the destinations B and C and the route (route segment) connecting the destinations D and E intersect with each other, and the route (route segment) connecting the destinations D and E and the route (route segment) connecting the destinations F and Last intersect with each other. Thus, because the user has to come to the first crossing point two times and the second crossing point two times, this order of tour is inefficient in terms of taking the shortest path.

In the example of FIG. 8B, which shows an order of tour determined by the method of the present invention when applied to the same destinations of FIG. 8A, there is no crossing point of the routes. As shown in FIG. 8B, in this case, the tour is changed to the order of: destinations A, B, D, C, F, E and the last destination. Since there is no intersecting point of route segments in this tour, the method of the present invention is able to provide the shortest overall length of the tour.

As shown in FIGS. 6A–6B, 7A–7B and 8A–8B, the method of the present invention changes the order of visiting the destinations when arising a crossing point in the overall route determined by the conventional method. Thus, in the method of the present invention, it is necessary to detect whether any two or more routes (route segments) intersect with one another, and if there is a crossing point, to change the order of tour so as not to cause any crossing point. An example of process for detecting the crossing point and changing the order of tour is done in a manner described in the following with reference to FIGS. 9 and 10.

Figure 9:
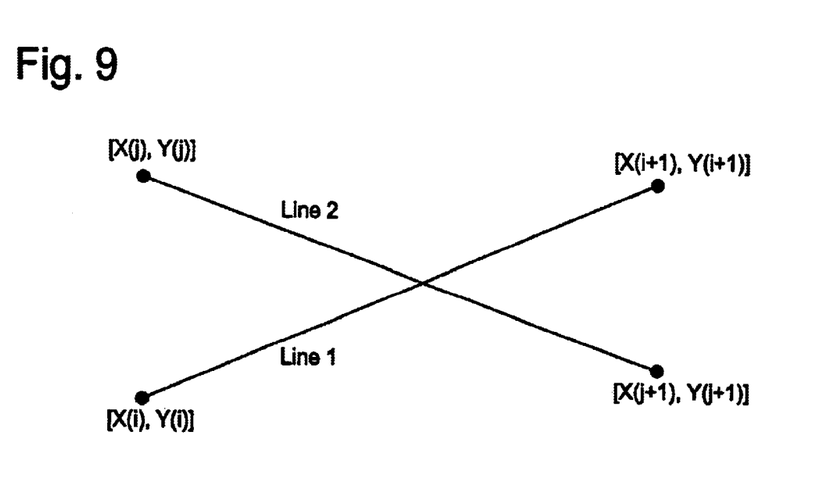
FIG. 9 is a schematic diagram showing two lines defined by X-Y coordinates for explaining a procedure for detecting a crossing point between two lines to identify two routes crossing with one another.

FIG. 9 shows two lines (route segments) crossing with one another for explaining an example of mathematical means for identifying the crossing point. In a navigation system, map data is provided so that each node is specified by coordinates data. Thus, in FIG. 9, line 1 is defined by [X(i), Y(i)] at one end and [X(i+1), Y(i+1)] at another end, and line 2 is defined by [X(j), Y(j)] at one end and [X(j+1), Y(j+1)] at another end by X-Y coordinates.

In this situation, an abscissa X and an ordinate Y on the line 1 is expressed as follows where T and S are variables:

$$X=X(i)+(X(i+1)-X(i))T$$

$$Y=Y(i)+(Y(i+1)-Y(i))T$$

Similarly, an abscissa X and an ordinate Y on the line 2 is expressed by:

$$X=X(j)+(X(j+1)-X(j))S$$

$$Y=Y(j)+(Y(j+1)-Y(j))S$$

The crossing point by the line 1 and line 2 will be:

$$X(i)+(X(i+1)-X(i))T=X(j)+(X(j+1)-X(j))S$$

$$Y(i)+(Y(i+1)-Y(i))T=Y(j)+(Y(j+1)-Y(j))S$$

By solving for both S and T:

$$S = \frac{[(X(j+1)-X(j))(Y(i)-Y(j))] - [(Y(j+1)-Y(j))(X(i)-X(j))]}{[(Y(j+1)-Y(j))(X(i+1)-X(i))] - [(X(j+1)-X(j))(Y(i+1)-Y(i))]}$$

$$T = \frac{[(X(i+1)-X(i))(Y(i)-Y(j))] - [(Y(i+1)-Y(i))(X(i)-X(j))]}{[(Y(j+1)-Y(j))(X(i+1)-X(i))] - [(X(j+1)-X(j))(Y(i+1)-Y(i))]}$$

If the line 1 crosses the line 2, then $0 \leq S \leq 1$ and $0 \leq T \leq 1$.

Thus, by calculating the above relationship, the navigation system is able to detect whether two lines (route segments in the overall route) cross with one another and identify such two route segments.

Figure 10:
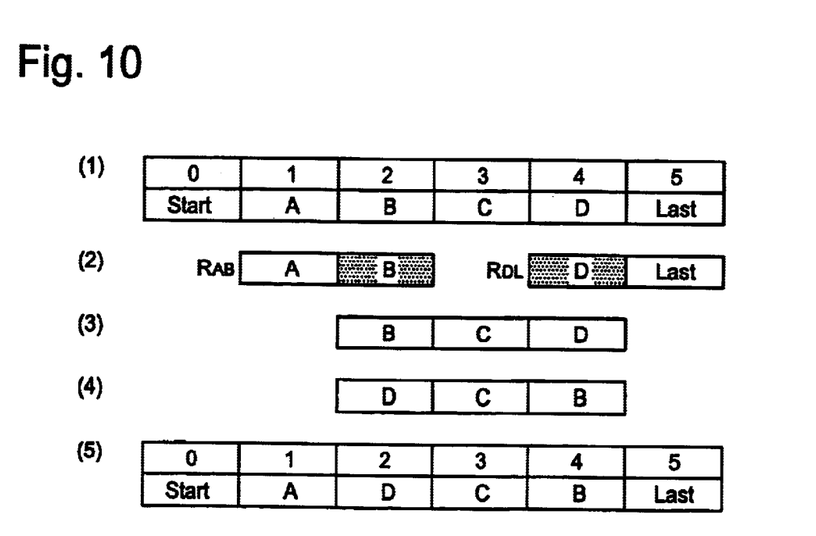
FIG. 10 is a diagram for explaining a procedure for changing the order of tour when two routes crossing one another are detected by the procedure of FIG. 9.

Upon identifying two route segments that cross one another by the calculation process noted above, the navigation system changes the order of the tour as shown in FIGS. 6B, 7B and 8B. An example of process for changing the order is shown in FIG. 10 which explains the case for visiting the same destinations as that shown in FIGS. 7A and 7B as an illustration purpose. The original tour involves the crossing point made by the route segment between the destinations A and B and the route segment between the destinations D and Last. These two route segments crossing one another are identified by the procedure described above with reference to FIG. 9.

In FIG. 10, a first step (1) shows the order of the tour originally made by the navigation system through the conventional method noted above which is the same as that shown in FIG. 7A. In a second step (2), two routes (route segments) intersecting with one another are detected, which are a route $R_{AB}$ (earlier route) and a route $R_{DL}$ (later route). Here, the navigation method of the present invention specifies or identifies the second destination of the earlier route $R_{AB}$, i.e., the destination B, and the first destination of the later route $R_{DL}$, i.e., the destination D as shown in the second step (2) in FIG. 10.

Then, in a third step (3), the navigation method identifies all the destinations between the destinations B and D, which are the destinations B, C and D. The process reverse the order of all of the destinations identified above as shown in a fourth step (4), which are in the order of D, C and B. Thus, the overall order of the tour is changed as shown in a fifth step (5) which is the same as that shown in FIG. 7B. Generally, when two routes $R_{(i,\ i+1)}$ and $R_{(j,\ j+1)}$ intersect with one another, the method of the present invention reverse the order of destinations i+1 and j and all destinations therebetween. Accordingly, the tour of FIG. 7B has no intersecting point.

Figure 11A:
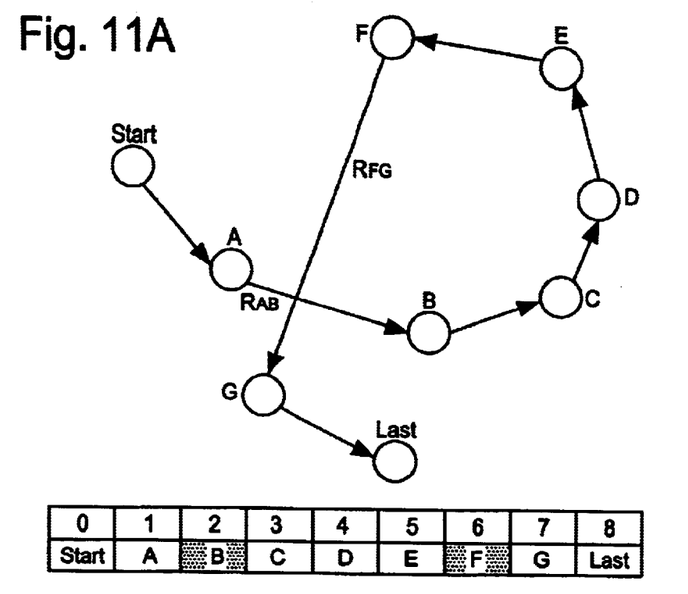
FIG. 11A is a diagram showing a further example of route for visiting the destinations in the conventional technology.
Figure 11B:
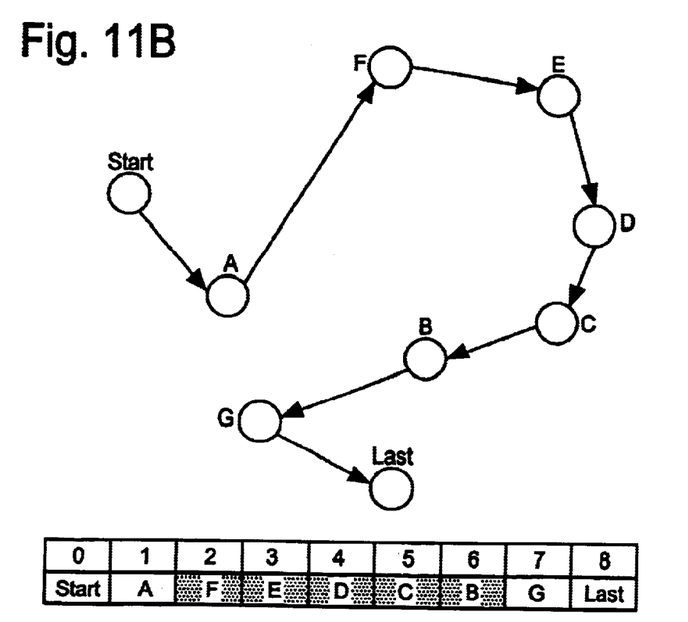
FIG. 11B is a diagram showing a route in accordance with the present invention for the same destinations of FIG. 11A.

FIGS. 11A and 11B show a further example of tour in which a user's plan includes many intermediate destinations before the final destination. FIG. 11A shows an order of tour determined by conventional method and FIG. 11B shows an order of tour in accordance with the present invention for the same destinations of FIG. 11A. In this example, the route (route segment) connecting the destinations A and B and the route (route segment) connecting the destinations F and G intersect with each other.

The two routes intersecting with each other are identified by the process noted above, which are the route $R_{AB}$ (earlier route segment) and the route $R_{FG}$ (later route segment). The second destination in the earlier route $R_{AB}$ is the destination B and the first destination of the later route $R_{FG}$ is the destination F. Thus, the order of the destinations and F and all other destinations therebetween, namely, B, C, D, E, F are reversed as mentioned with reference to the fourth and fifth steps shown in FIG. 10. Therefore, the new order of destinations is created as shown in FIG. 11B in which no crossing point is involved in the tour.

Figure 12:
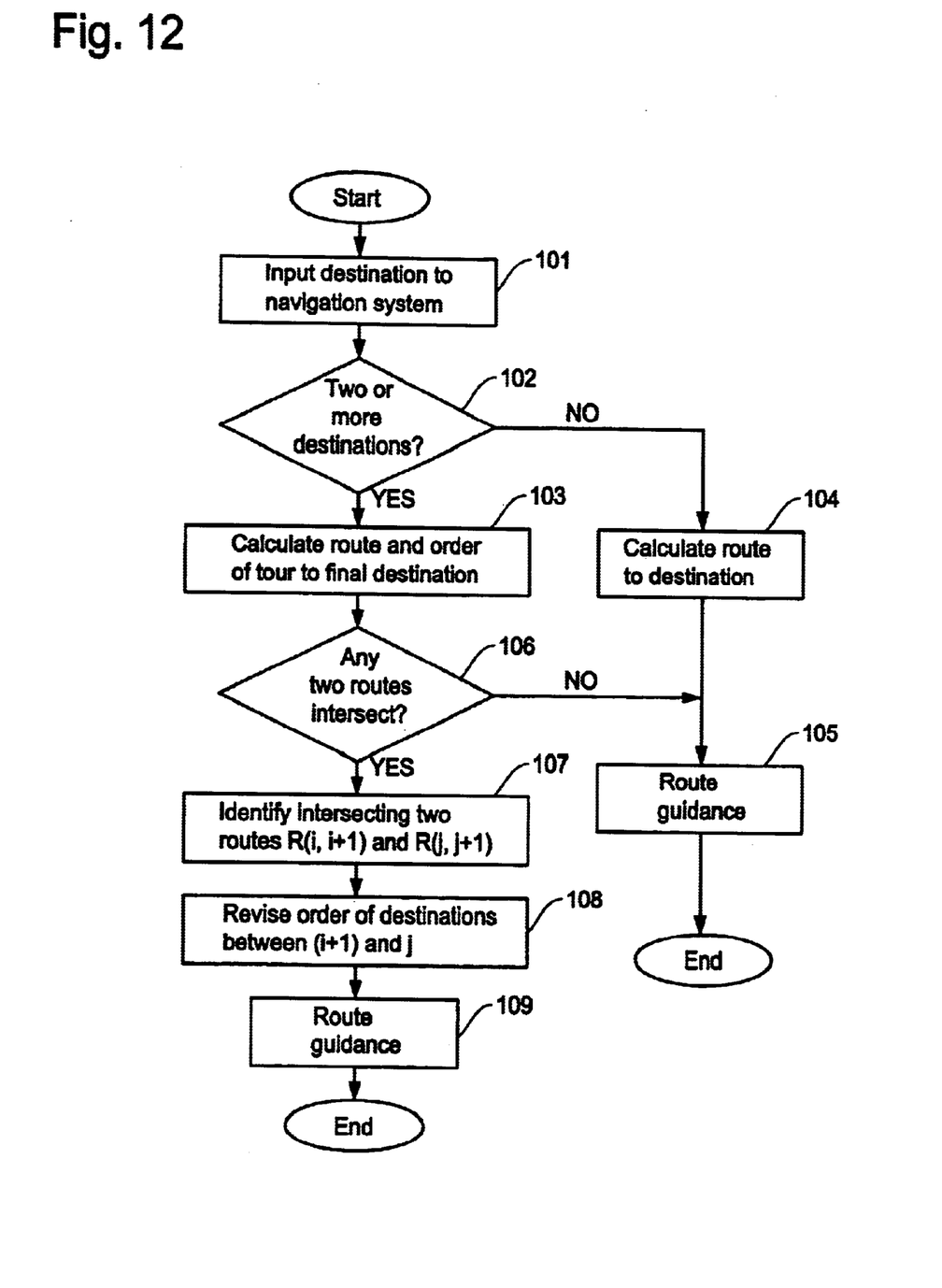
FIG. 12 is a flow chart showing an operation of the navigation system of the present invention for finding a shortest path.

FIG. 12 is a flow chart showing a process for finding a shortest path in the present invention. At step 101, the user inputs a destination in the navigation system. When the user wants to visit many places before the last destination, he will specify such intermediate destinations in, for example, a "Today's Plan" menu of the navigation system. The navigation system checks whether two or more destinations are requested by the same user in step 102. In the case when only one destination is specified, the navigation system calculates the route to the destination at step 104 and moves to the route guidance mode such as shown in FIG. 1B at step 105.

If two or more destinations are requested, the navigation system calculates an overall route (tentative route) and order of visiting the destinations at step 103. Typically, this process is conducted by the route finding algorithm used in the conventional method such as finding the shortest (or lowest cost) destination from the current destination. In the present invention, the navigation system checks whether any two routes (route segments) intersect with one another at step 106. This process is carried out, for example, by the mathematical process described with reference to FIG. 9.

Therefore, in the case where there is a crossing point by two routes (route segments), such routes $R_{(i,\ i+1)}$ (earlier route segment) and $R_{(j,\ j+1)}$ (later route segment) are identified in step 107. Then the second destination i+1 of the earlier route segment $R_{(i,\ i+1)}$ and the first destination j of the later route segment $R_{(j,\ j+1)}$ and any destinations between the destinations i+1 and are reversed the order in step 108. As a result, the overall route to the final destination no longer includes the intersecting point in the tour. The navigation system moves to the route guidance mode in step 109 to guide the user to various destinations.

As has been described, according to the present invention, the navigation method and system enables the user to visit many intermediate destinations and the final destination through the shortest path.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for finding an optimum route of tour having multiple destinations, comprising the following steps of:

specifying two or more intermediate destinations to visit before a final destination;

calculating a route to all of the destinations and tentatively determining an overall route specifying an order of tour of the intermediate destinations before reaching the final destination, said overall route including two or more route segments each connecting two destinations;

checking the overall route as to whether any two route segments intersect with one another; and identifying the destinations of the route segments intersecting one another and reversing the order of destinations of the intersecting route segments so that the two route segments no longer intersect with one another.

2. A navigation method as defined in claim 1, wherein said step of checking the overall route includes a step of calculating and varying X-Y coordinates of any route segments to find if there is any intersecting point between the two route segments.

3. A navigation method as defined in claim 1, wherein said step of reversing the order of destinations includes a step of detecting a first route segment and a second route segment intersecting with one another where the first route segment comes before the second route segment in the overall route, and a step of identifying a second destination of the first route segment and a first destination of the second route segment.

4. A navigation method as defined in claim 3, wherein said step of reversing the order of destination includes a step of reversing the order of the second destination of the first route segment and the first destination of the second route and any destinations therebetween.

5. A navigation method as defined in claim 1, wherein said step of reversing the order of destination includes a step of identifying a first route segment $R_{(i,\ i+1)}$ and a second route segment $R_{(j,\ j+1)}$ intersecting with one another where the first route segment comes earlier than the second route segment in the overall route, and reversing the order of a second destination i+1 of the first route segment $R_{(i,\ i+1)}$ and a first destination j of the second route segment $R_{(j, j+1)}$ and any destinations between the destinations i+1 and i.

6. A navigation system for finding an optimum route of tour having multiple destinations, comprising:

means for specifying two or more intermediate destinations to visit before a final destination;

means for calculating a route to all of the destinations and tentatively determining an overall route specifying an order of tour of the intermediate destinations before reaching the final destination, said overall route including two or more route segments each connecting two destinations;

means for checking the overall route as to whether any two route segments intersect with one another; and means for identifying the destinations of the route segments intersecting one another and reversing the order of destinations of the intersecting route segments so that the two route segments no longer intersect with one another.

7. A navigation system as defined in claim 6, wherein said means for checking the overall route includes means for calculating and varying X-Y coordinates of any route segments to find if there is any intersecting point between the two route segments.

8. A navigation system as defined in claim 6, wherein said means for reversing the order of destinations includes means for detecting a first route segment and a second route segment intersecting with one another where the first route segment comes before the second route segment in the overall route, and means for identifying a second destination of the first route segment and a first destination of the second route segment.

9. A navigation system as defined in claim 8, wherein said means for reversing the order of destination includes means for reversing the order of the second destination of the first route segment and the first destination of the second route and any destinations therebetween.

10. A navigation method as defined in claim 6, wherein said means for reversing the order of destination includes means for identifying a first route segment $R_{(i, i+1)}$ and a second route segment $R_{(j, j+1)}$ intersecting with one another where the first route segment comes earlier than the second route segment in the overall route, and reversing the order of a second destination i+1 of the first route segment $R_{(i, i+1)}$ and a first destination j of the second route segment $R_{(j, j+1)}$ and any destinations between the destinations i+1 and i.

* * * * *